Nov. 28, 1939.       P. LOCKHART       2,181,761
SIGNAL
Filed Dec. 2, 1937
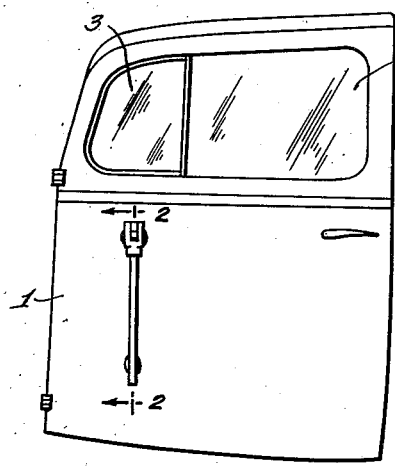
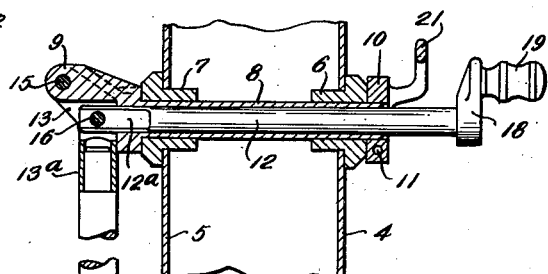
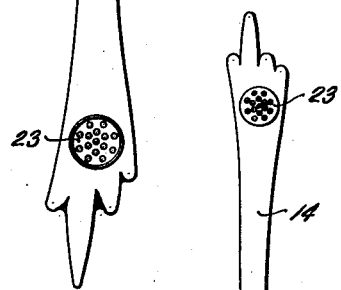
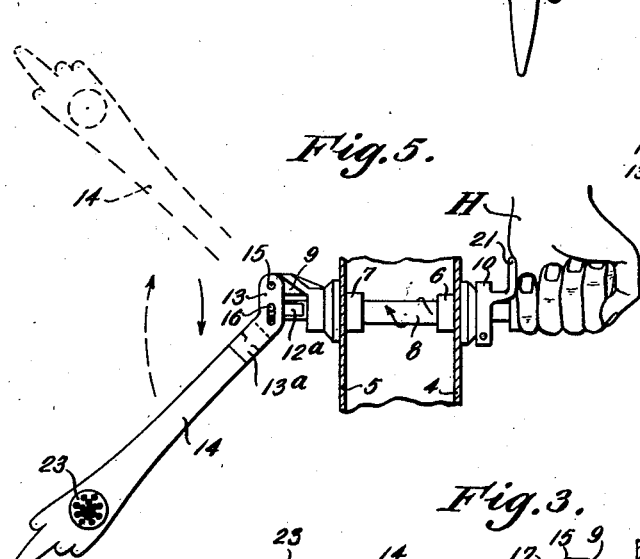
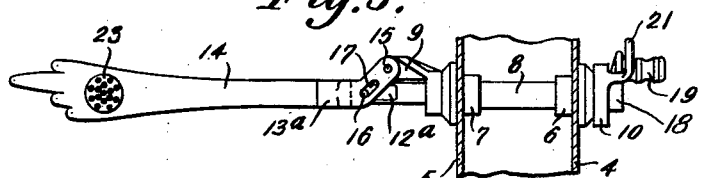
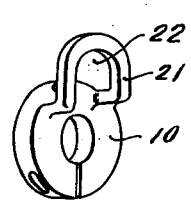
Inventor,
Percy Lockhart,
by Roberts Cushman & Woodbury
Attys.

Patented Nov. 28, 1939

2,181,761

UNITED STATES PATENT OFFICE 2,181,761

SIGNAL

Percy Lockhart, Ann Arbor, Mich.

Application December 2, 1937, Serial No. 177,747

7 Claims. (Cl. 116—52)

This invention pertains to vehicle signals and relates more particularly to a signal designed to indicate the intention of the driver with respect to turning or stopping.

It is now customary, and in many communities obligatory, for the driver of a motor vehicle to extend his hand and arm outside of the vehicle body when he contemplates making a right or left turn, slowing down, or stopping, but the width of the vehicle body (in the case of many trucks) and/or the height of the window-sill (in many of the more recent models of pleasure car) make it impossible or at least very inconvenient for the operator to give any adequate signal merely by employing his hand or arm for the purpose. Various devices, both mechanical and electrical, have been designed to take the place of the hand and arm in signaling, but so far as I am aware none of these prior devices has been wholly successful for the purpose. Electrical devices are not wholly to be depended upon, while mechanical devices have, in most instances, been complicated and difficult and expensive to install, particularly if designed at all adequately to serve the intended purpose. Moreover, in most instances, at least, such prior devices are not of general utility. In this connection it is to be remembered that no universal system of signaling has thus far been recognized; and, in accordance with various requirements, the arm must be directed upwardly or downwardly, either substantially vertically or on an incline; or held substantially horizontal; or for some purposes that the hand be swung in a more or less circular arc. Accordingly any mechanical device satisfactory to take the place of the operator's arm and hand must be capable of conforming to all of the above requirements at least.

Principal objects of the present invention are to provide a signal of simple and durable construction which may readily be installed in motor vehicles of any usual design without requiring the use of expensive tools or highly skilled labor; to provide a signal capable of giving any of the various signals employed in the several signaling systems commonly in use; to provide a signal which may readily and effectively be actuated by the use of one hand only, so that the operator may be free to keep one hand at least on the steering wheel while manipulating the signal; to provided a signal which is easy to manipulate but which automatically tends to return to a predetermined inactive position when not in use, and which, while rugged and durable, may be made at a reasonable cost.

A further object is to provide a signal device so designed as to permit the user to dispose the signal or semaphore arm at a predetermined definite angle of inclination, without the exercise of especial care preparatory to moving it in a path of more or less circular contour.

Other and further objects and advantages of the invention will be made manifest in the following more detailed description and by reference to the accompanying drawing wherein Fig. 1 is a diagrammatic side elevation of the door of a motor car with the present invention applied thereto;

Fig. 2 is a fragmentary vertical section on the line 2—2 of Fig. 1, but to larger scale, showing the signal device in the normal inactive position;

Fig. 3 is a fragmentary view similar to Fig. 2, but to somewhat smaller scale, showing the relative arrangement of the parts when the signaling arm is disposed substantially horizontal;

Fig. 4 is a view similar to Fig. 3 but showing the signaling arm disposed vertically;

Fig. 5 is a view similar to Fig. 3 but showing the arm disposed diagonally and indicating how it may be swung while in this diagonal position; and Fig. 6 is a perspective view to larger scale showing a combined abutment and clutch device forming a desirable feature of the present invention.

Referring to the drawing, the numeral 1 designates the door of a motor vehicle, the door being taken as a convenient example of a portion of the vehicle wall, it being understood that the signal of the present invention may be applied to other parts of the vehicle wall as well as to the door. As shown in Fig. 1, the door comprises a window 2 which may be moved vertically, and a ventilator panel 3 which may be swung about a vertical axis, and since the panel 3 does not drop down into the lower part of the door, the space below this ventilator 3 is a convenient point for the location of the improved signal.

Referring to Fig. 2, the signal device, in accordance with the present invention, preferably comprises a pair of sleeves or bushings 6 and 7 which may be of any suitable material, for example vulcanized rubber, artificial rubber, synthetic resin or the like, each sleeve having a cylindrical portion designed to fit within an opening in the structure of the vehicle wall and an outer portion of larger diameter designed to engage the outer surface of such wall. As shown in Fig. 2, the vehicle wall comprises spaced inner and outer members 4 and 5 and the bushings 6 and 7 are disposed in alignment in openings in these inner and outer members.

A supporting sleeve 8 is mounted to turn in the bushings 6 and 7,—the sleeve 8 projecting at both ends from the wall of the vehicle, and at its outer end being provided with a bracket member 9. This bracket member may be integral with the material of the sleeve, or a part secured to the end of the sleeve, as may be preferred, but in any case it is rigidly united to the sleeve. At its opposite end the sleeve 8 is furnished with a split collar 10 which bears against the inner end of the bushing 6, thus preventing endwise movement of the sleeve in the bushings,—the collar being secured in place by means of a clamping screw 11 so that it is fixed to the sleeve.

Within the sleeve 8 is an actuating rod 12 which projects at opposite ends from the sleeve, the outer end of the rod being flattened as indicated at 12ª. The signal proper consists of a semaphore arm which is here shown as comprising an elbow lever having the upper part 13 and the lower tubular part 13ª. The part 13 is bifurcated and straddles a narrow tongue-like portion of the bracket 9,—being pivotally united to the bracket by means of a pivot pin 15, the axis of which extends transversely and substantially at right angles to the axis of the rod 12. The axis of the pin 15 is offset or eccentric to the axis of the rod 12. The semaphore arm also comprises the elongate member 14 whose upper end is fitted snugly within the tubular portion 13ª of the elbow lever to which it is fixedly secured in any desired manner, for example by a pin, set screw or the like. The free end of the member 14 may be given any desired contour, for example, as here shown, a contour more or less simulating the human hand. Preferably the free end of the member 14 is of sufficient weight so that when allowed to do so it swings downwardly by the action of gravity and moves the several parts into the relative positions shown in Fig. 2. The flattened end 12ª of the rod 12 is pivotally secured to the elbow lever by means of a pivot pin 16 whose axis is parallel to that of the pin 15 and arranged substantially at the junction of the two angularly disposed portions 13 and 13ª of the elbow lever. The pin 16 is conveniently fixed to the rod 12 but works in an elongate slot 17 (Fig. 3) in the elbow lever.

At its inner end the rod 12 is furnished with a crank arm 18 which is provided with a crank pin 19 constituting an actuating handle whereby the rod 12 may be moved axially within the sleeve 8 or caused to rotate, at will. A rigid abutment 21 of more or less U shape (Fig. 6) projects from the collar 10 and has a recess 22 more or less radial to the axis of the collar 10. The dimensions of the recess 22 and the member 18 are such that the member 18 may freely enter the recess, when, with the parts relatively positioned as in Fig. 2, the rod 12 is moved to the left as far as it will go by means of the handle 19. While the handle 19 is here illustrated as one convenient means for moving the rod 12, it is to be understood that this handle is merely illustrative of any means whereby the rod may be actuated.

When not in use, the weight of the member 14 holds the parts in the position of Fig. 2, this being what may be termed the normal position of the signal. However, if it should be desired to extend the member 14 horizontally, it is merely necessary for the operator to grasp the end of the handle 19 and move it bodily to the left until the crank 18 enters recess 22 as shown in Fig. 3,—the connections between the parts 12 and 13 causing the semaphore arm to swing about the axis of the pivot 15 through an arc of substantially 90°, the resultant position of the arm being that which is sometimes employed for indicating a left turn.

If, on the other hand, it be desired to cause the member 14 to extend upwardly in a substantially vertical position, the operator seizes the handle 19 (when the parts are positioned as shown in Fig. 2) and thereby turns the rod 12 about its own axis through substantially 180°, the connections between the rod, the arm and the bracket 9 constraining the sleeve 8 to turn together with the rod, thus bodily swinging the arm 14 about the coincident axes of the rod 12 and the sleeve 8.

If the operator wishes to swing the member 14 to a definite predetermined diagonal position, as shown in full lines in Fig. 5, he grasps the handle 19 with his left hand in such a manner that the little finger of his left hand engages the right hand surface of the crank member 18. He then slides the rod 12 to the left until the side of his hand H engages the abutment 21. In so moving the rod 12, he swings the member 14 through a definite angle, for example 45°, dependent upon the initial spacing of the parts 18 and 21, such position of the member 14 corresponding, for example, to a signal for slowing down. If it be desired to swing the member 14 so as to describe a substantially conical surface in space, as is sometimes required for signaling a turn to the right, the operator grasps the handle 19 and slides the rod 12 to the left until his hand engages the abutment, as just above described, so that the semaphore arm is disposed in a definite diagonal position and then, while the hand occupies this position, with respect to the abutment, he rotates the handle 19 thereby causing the member 14 to describe a geometrical conical surface in space while revolving about the axis of the rod 12.

In whatever position the member 14 may be when the operator releases the handle 19, it tends to return to its inactive position, as shown in Fig. 2, merely by the action of gravity, to some extent assisted by the vibration of the vehicle which serves to overcome any frictional resistance which the parts may offer.

It will be observed that the device is of simple and durable construction, that it comprises but three relatively movable parts, to wit the rod 12, the sleeve 8 and the semaphore arm comprising the relatively fixed parts 13, 13ª and 14; that no springs or other devices are required to assist in returning the parts in normal position; and that no gearing, electrical or magnetic elements are necessary to move the semaphore arm to any of the desired positions for signaling or for giving the desired signals.

While one desirable embodiment of the invention has been illustrated by way of example, it is to be understood that the invention is not necessarily limited to this precise embodiment but that any equivalent details of construction are to be regarded as falling within the purview of the appended claims.

I claim:

1. A signal device for use in motor vehicles, said signal device comprising a semaphore arm normally disposed in substantially vertical position outside of the vehicle body, means supporting the arm so that it is free at all times to revolve about an axis which is substantially perpendicular to the outer surface of the vehicle body and in a plane which is substantially parallel to the outer surface of the vehicle body, and also so as to be free to swing at all times in a plane radial to said axis through an angle of at least 90°, and a single actuating member constructed and arranged for manual movement in either of two different paths thereby to move the arm in either of said planes at will.

2. A signal of the class described comprising a semaphore arm, means for supporting the arm and means for actuating the arm, said supporting and actuating means being so constructed and arranged as to permit the arm to be extended either horizontally, vertically or in an inclined position, the actuating means comprising a single handle movable in a circular path and operative when the arm is disposed in inclined position to cause the arm to describe a geometric cone in space.

3. A signal device of the class described comprising a rotary sleeve, fixed bearings for the sleeve, a bracket fixed to the outer end of the sleeve, a semaphore arm pivotally secured to the bracket to swing about an axis transverse and eccentric to that of the sleeve, a rotatable and axially movable actuating rod extending through the sleeve, pivotal connections between the actuating rod and the semaphore arm, and actuating means connected to the inner end of the rod by means of which the latter may be moved axially and/or rotated.

4. A signal device of the class described comprising a rotary sleeve, fixed bearings for the sleeve, a bracket fixed to the outer end of the sleeve, a semaphore arm pivotally secured to the bracket to swing about an axis transverse and eccentric to that of the sleeve, a rotatable and axially movable actuating rod extending through the sleeve, pivotal connections between the actuating rod and the semaphore arm, a handle at the inner end of the rod by means of which the rod may be moved axially or rotated at will, and means, carried by the sleeve, engageable by the hand of the operator when grasping the handle to limit axial movement of the rod.

5. A signal device for use in motor vehicles, said signal device comprising a semaphore arm normally disposed in a substantially vertical position outside of the vehicle body, a support for the arm arranged to turn about an axis substantially perpendicular to the outer surface of the vehicle body, pivot means uniting the arm to the support at a point eccentric to said axis, the pivotal axis of the arm extending transversely to the axis of the support, a rotatable and axially movable actuating rod extending axially of the support, means pivotally uniting the rod to the arm at a point spaced from the pivotal axis of the latter, a handle fixed to the rod by means of which the latter may be moved axially and/or rotated at will, an abutment engageable by the hand of the user to limit further axial movement of the rod after the actuating handle has been moved to a predetermined position, said abutment being so devised and arranged as to permit the handle to be turned while the hand of the operator engages the abutment.

6. A signal comprising a pair of bearings constructed and arranged to be disposed in alignment in the inner and outer members of a vehicle wall, a rotary sleeve supported by said bearings, bracket means at the outer end of the sleeve, a pivot carried by the bracket means, said pivot having its axis eccentric and transverse to the axis of the sleeve, a semaphore arm having an opening adjacent to one end for the reception of the pivot pin, the arm normally depending freely from said pin, a rotatable rod arranged to slide axially within the sleeve, pin and slot connections between the rod and arm, an abutment fixed to the inner end of the sleeve, said abutment having a radial recess, a crank arm on the inner end of the rod, said crank arm being of such dimensions as freely to enter the recess in the abutment, and a handle carried by the crank arm for rotating the rod, the rod being of such length that when the semaphore arm is freely depending in substantially vertical position the crank arm is disengaged from the recess in the abutment.

7. A signal comprising a semaphore arm and means supporting the arm, said supporting means being constructed and arranged to permit the arm to turn through an angle of at least 180° about a predetermined axis and to swing through an angle of at least 360° about an axis transverse to the first, said arm normally depending by gravity from its point of support so as to occupy an inactive position, and a single actuating handle, said handle being mounted to move at will in different paths, and connections between the handle and the arm so constructed and arranged that movement of the handle in one of such paths swings said arm about the first of said axes through an angle of approximately 180°, and movement of the handle in another of said paths swings the arm about the other axis through an angle of 360°.

PERCY LOCKHART.